United States Patent [19]
Cucchi

[11] Patent Number: 5,881,617
[45] Date of Patent: Mar. 16, 1999

[54] BAR FEEDER FOR MULTI-SPINDLE LATHES, WITH SELECTIVE DRIVE

[75] Inventor: Giovanni Cucchi, Bussero, Italy

[73] Assignee: Cucchi Giovanni & C. S.R.L., Bussero, Italy

[21] Appl. No.: 753,731

[22] Filed: Nov. 29, 1996

[30] Foreign Application Priority Data

Nov. 28, 1995 [IT] Italy .................................. MI95A2481
Mar. 6, 1996 [IT] Italy .................................. MI96A0436

[51] Int. Cl.⁶ .................................................. B23B 15/00
[52] U.S. Cl. ................................ 82/127; 82/124; 82/125; 82/126; 414/17
[58] Field of Search ........................... 82/127, 126, 125, 82/124; 414/14, 17, 18

[56] References Cited

U.S. PATENT DOCUMENTS

| | | | |
|---|---|---|---|
| 3,812,983 | 5/1974 | Wanner et al. ..................... | 82/126 X |
| 3,874,519 | 4/1975 | Mikami . | |
| 3,955,687 | 5/1976 | Flisch . | |
| 4,088,230 | 5/1978 | Doe et al. . | |
| 4,122,735 | 10/1978 | Evers . | |
| 4,292,864 | 10/1981 | Cucci et al. ........................ | 82/126 X |
| 4,604,924 | 8/1986 | Cucchi et al. . | |
| 4,679,470 | 7/1987 | Geiser et al. ...................... | 82/126 |
| 4,700,593 | 10/1987 | Cucchi . | |
| 5,115,702 | 5/1992 | Link ................................... | 82/127 X |
| 5,401,230 | 3/1995 | Momoi et al. ..................... | 82/124 X |

FOREIGN PATENT DOCUMENTS

0 123 658  10/1984  European Pat. Off. .
0 174 034   3/1986  European Pat. Off. .
0 338 606  10/1989  European Pat. Off. .

*Primary Examiner*—Andrea L. Pitts
*Assistant Examiner*—Henry W. H. Tsai
*Attorney, Agent, or Firm*—Young & Thompson

[57] ABSTRACT

A bar feeding device for multi-spindle machine tools includes a rotating drum provided with a plurality of guides for the bars, which longitudinally extend in different angular positions on the outer surface of the drum. Bar pushing members slidingly movable along the guides are connected to a control system comprising a set of peripheral gears circumferentially arranged at one end, and supported to rotate with the drum, coplanarly around a central pinion gear connected to a drive motor. The pinion gear is tangentially arranged in an offset angular position to selectively engage each peripheral gear over a predetermined arch shaped path by rotation of the drum.

24 Claims, 5 Drawing Sheets

BAR FEEDER FOR MULTI-SPINDLE LATHES, WITH SELECTIVE DRIVE

BACKGROUND OF THE INVENTION

The present invention refers to an automatic apparatus for feeding elongated work-pieces, such as bars and the like, to multi-spindle machine tools and, more generally refers to improvements to the drive devices of the bar pushing members in bar feeders of rotating drum type, for allowing a selective operation when the feeder drum is at a standstill with a guide for the bars in a predetermined angular position, as well as when the drum is rotationally actuated by the same machine tool. In this way it is possible to anticipate the forward movement of the bars while each spindle of the machine tool is rotating and approaching a predetermined working position.

Automatic apparatuses for loading and feeding bars to be worked to multi-spindle machine tools are generally well known. Typically, such an apparatus comprises a frame member for supporting a bar guide drum that rotates about a horizontal axis coinciding with the rotational axis of the spindle-holder turret of the machine tool. Bar guides longitudinally extending with respect to the drum are provided in angular spaced apart positions and axially aligned to corresponding spindles of the machine tool, each guide for the bars being provided with a bar-pushing member selectively operated to move a bar forward through a respective spindle of the machine, when the drum is at a standstill, and the guide is in a predetermined angular position.

Apparatuses of the above mentioned type are shown and described in several prior patents, for example in U.S. Pat. No. 3,874,519, U.S. Pat. No. 3,955,687, U.S. Pat. No. 4,088,230, U.S. Pat. No. 4,122,735, U.S. Pat. No. 4,292,864, U.S. Pat. No. 4,604,924 and U.S. Pat. No. 4,700,593.

It is also well known that in multi-spindle automatic lathes the working speed is constantly increased and the operative cycles are correspondingly reduced to increase production rates. Consequently the structure and the operative mode of the bar feeder automatic apparatuses were improved to satisfy the new and increased requirements of these machine tools.

For example, a prior European Patent Application EP-A-0 123 658 discloses a drive device for the bar pushing members of a drum feeder of the known type, which uses a mechanical drive device comprising a plurality of gear members operationally connected by endless chains to a respective bar-pushing member. The various gears are radially arranged with their axes at one end of the drum to rotate with the latter, and gear coupling means are provided to connect each gear member to a power operated conical gear co-axially arranged with respect to the drum. A circular cam acts on the coupling means to selectively connect each pushing member to a drive motor of the central conical gear while the drum of the feeder is rotating and a selected one of the bar guides is approaching to a predetermined angular position.

This solution, even if allowing the forward movement of the bars as soon as the spindle collets of the machine tool are opened while the feeder drum is rotating, in practice presents quite a complex structure which, because of the delays caused by the coupling backlashes, does not allow for perfect synchronization during operation of the device. Moreover, the more complex coupling system at one end of the drum, with its own weight and inertia negatively affects the drum by opposing to the rotational force exerted by the machine tool itself. The use of such a drive device does not allow operation at high rotational speeds, and therefore the feeder cannot be used in machine tools of the fast type. Moreover, the extreme mechanical complexity of the drive device makes it difficult to set-up, and causes higher breakdown risks due to bad coupling operation and higher maintenance costs.

In order to improve such a feeder, European Patent Application EP-A-0 174 034, discloses another mechanical solution, which is simplified in some particulars, but however employs teeth couplings connectable to the pushing members and operating only when the drum is at a standstill when each guide for the bars is in an angular position where the bars can be moved forward in the respective spindle of the machine tool.

Although with this second solution the bar feeder is simplified and the entire weight of the drum is partially reduced, it does not allow for an anticipated feeding of the bars when the drum is revolving. Therefore it cannot be used in machine tools of the fast type.

In a further European Patent Application, EP-A-0 338 606, an hydraulic solution has been suggested, according to which hydraulic drive motors are used for each pushing member, wherein the various hydraulic motors are supported at one end of the drum to be selectively fed by a suitable rotating oil distributor.

This document suggests only a different solution to the problem of the anticipated forward movement of the bars, without achieving the aim of simplifying the feeder construction and substantially reducing the weight of the rotating bar guide drum.

On the contrary, under some points of view, this hydraulic solution is quite worse with respect to a mechanical solution, as the higher weight of the hydraulic motors and of the oil herein contained, constitute a concentrated mass which can cause distortions to the drum when the latter is under rapid rotation, thus requiring drums having a sturdy construction and consequently a higher weight.

SUMMARY OF THE INVENTION

An object of the present invention is to provide a bar feeder for multi-spindle machine tools of the above mentioned type, which uses a mechanical solution for driving the bar-pushing members, by means of which it is possible to achieve the two aims of decreasing the weight of the whole rotating structure of the drum and of allowing a selectively anticipated feeding of the single bars while the drum is still rotating, which, when necessary, can be changed thus enabling the feeder to be particularly suitable for use in multi-spindle machine tools of the fast type. With the total elimination of the mechanical coupling, the rotating drum is remarkably lightened, consequently reducing the risk of distortions and/or deformations of the drum and of the bar guides, as well as damages to the bars.

A further object of the present invention is to provide a bar feeder as previously referred to, wherein the drive of the pushing members is quite simplified, because it takes advantage of the rotation of the drum to selectively connect each pushing member to a single drive motor, by means of an original and extremely simplified gear system. Such a feeder requires minimum maintenance and consequently reduces maintenance. Reliability is high because the number of moving parts subjected to wear is greatly reduced with respect to a conventional bar feeding device.

The particularly innovative and original feature of the present invention, resides in the use of the same rotation of the feeder drum and a particular crown wheel system to selectively connect each bar pushing member to a single drive motor.

Moreover, the proposed solution drives each bar pushing member at one or more working positions and arranges an adequate advance angle for driving the bar pushers that is self-adjusting to the requirements of different working machines.

According to the invention, a bar feeder for multi-spindle machine tools includes a support frame for a drum member rotatably supported by the frame to turn about a horizontal axis, the drum member being provided with a plurality of bar guides longitudinally extending in angularly spaced apart positions, said bar guides being axially aligned with corresponding spindles of the machine tool; bar pushing members slidably supported to move along said guides, in combination with a mechanical drive system comprising a plurality of peripheral crown gear members, circumferentially arranged to the rotational axis of the drum, each crown gear being operatively connected to a respective bar-pushing member, said crown gears being provided at one end of the drum and supported to rotate with respect to a central drive gear member connected to a drive motor for sliding each bar pushing member along the guides for the bars, wherein the crown gears and the drive gear member are coplanar with respect to each other, to provide rotational axes parallel to the longitudinal rotating axis of the drum, in that the drive gear is provided in a offset position with respect to the rotation axis of the drum, and tangentially arranged inside the crown gears to selectively engage and disengage each peripheral gear member along a predetermined arched path, by the rotation of the feeder drum.

BRIEF DESCRIPTION OF THE DRAWINGS

These and other features and advantages of the bar feeder according to the invention will be more clear from the following description of some preferred embodiments making reference to the attached drawings, wherein.

DESCRIPTION OF THE INVENTION

Figure 1:
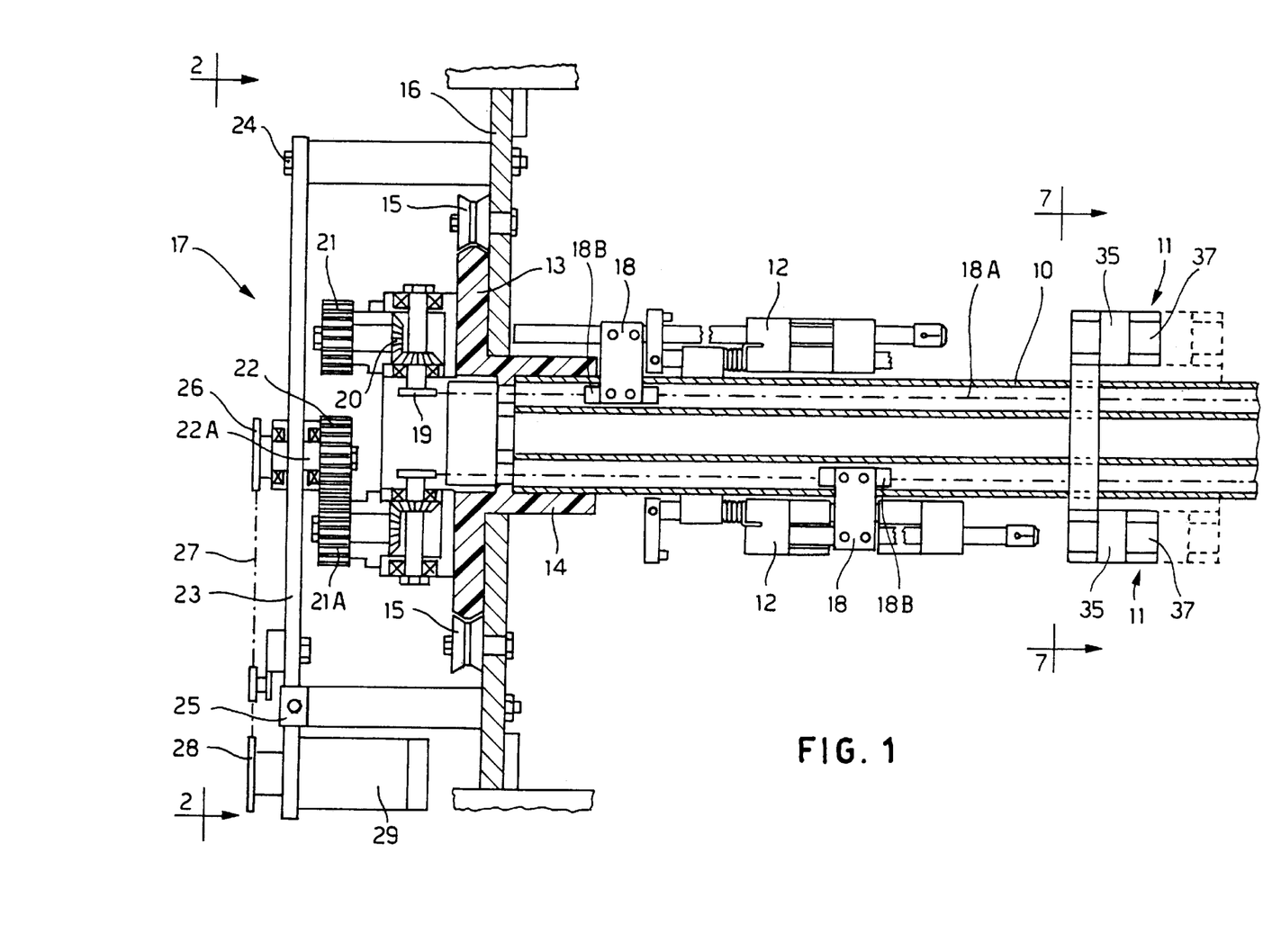
FIG. 1 is a longitudinal sectional view of part of a feeder according to the invention.
Figure 2:
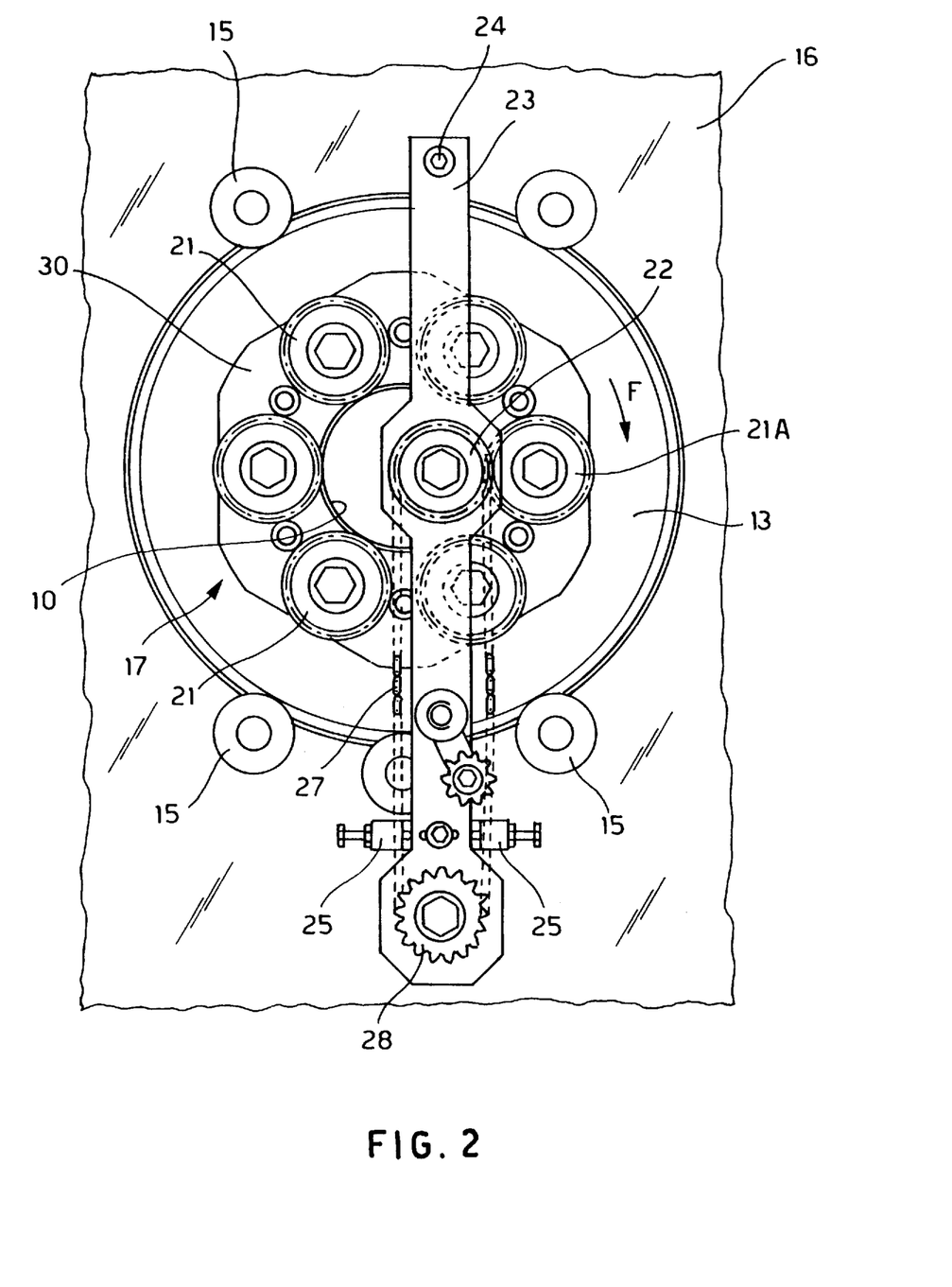
FIG. 2 is a front view, according to line 2—2 of FIG. 1.
Figure 7:
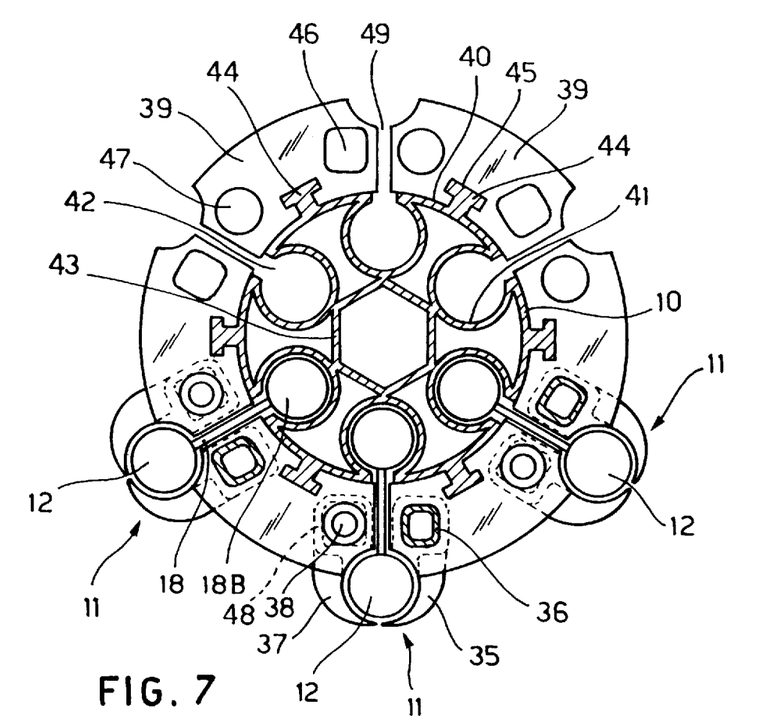
FIG. 7 is a cross-sectional view according to line 7—7 of FIG. 1.

With reference to FIGS. 1 and 2, the feeder according to the invention substantially comprises a drum 10 constituted, for example, by a special section in aluminium, and provided with a plurality of bar guides 11 longitudinally extended with respect to the drum 10 in angularly spaced apart positions shown in FIG. 7. Each bar guide 11 is provided with a respective bar pushing member 12 which is suitably driven to slide along the respective bar guide 11.

The drum 10 is supported at each end to rotate about its longitudinal axis, by means of a disk 13 made of plastic material, provided with hollow hub 14 wherein one end of the drum 10 is fitted and suitably blocked to prevent removal of the drum. The disk 13 is supported to rotate by a set of idle rollers 15 provided on a support plate 16 which is part of the frame structure of the feeder. Reference 17 in FIGS. 1 and 2 further indicates the whole mechanical drive device of the bar pushing members 12 according to the invention.

More precisely, each bar pushing member 12 is supported to longitudinally slide along one bar guide 11 and is connected, by means of a plate 18, to an endless chain 18A which runs inside the drum 10. At the back end of the drum which is opposed to the front end connected to the machine tool, the chain 18A engages a cogged wheel 19 operatively connected to a cylindrical gear 21 by means of conical idle gears 20, the rotational axis of the cylindrical gear 21 being parallel to the longitudinal rotational axis of the drum 10.

As it can be seen in FIG. 2, the drive mechanism 17 comprises a set of the cylindrical gears 21 circumferentially arranged to define a crown gear system rotatably supported with the drum 10, to selectively engage and disengage a central pinion gear 22 along an arched path. Each of the cylindrical gears 21 in the crown gear system is mechanically connected to a respective bar pushing member 12, without any intermediate coupling member, and the cylindrical gears 21 are coplanar with respect to each other, as well as with respect to the central pinion gear 22 connected to a rotating shaft 22A supported by a tiltable support element, for example a transversal rod 23 pivoted at its top end 24. The rod 23 near its lower end rests against two side adjustable stop members 25 which bias the rod 23 to engage the pinion gear 22 with the cylindrical gears 21, as will be explained later. A cogged wheel 26 is provided at the rear end of the shaft 22A (FIG. 1), said wheel 26 being connected by a chain 27 to a second cogged wheel 28, or in another way, of a drive motor 29 which in turn is supported at the lower end of the rod 23. The drive motor 29 may be of any suitable type, for example hydraulic, electric or pressure air actuated type.

As shown in FIG. 2, the cylindrical gears 21 are provided on a support plate 30 fixed by bolts to the disk 13 maintaining a circumferential disposition of their rotational axes, parallel to the longitudinal axis of the drum.

With further reference to FIG. 2, the central pinion gear 22 is supported by the bar 23 in a predetermined angular position, which is offset with respect to the longitudinal axis of the drum, tangentially inside the crown of cylindrical gears 21 to selectively engage with each one of the cylindrical gears 21 in a predetermined angular position indicated by way of example by the crown gear 21A, while rotating with the drum 10 according to the arrow F in FIG. 2.

The engagement position of the central pinion gear 22 with the crown of cylindrical gears 21 may be suitably adjusted by acting on the side stops 25. It should be noted that for simplifying the description, the position of the gear 21A, which in FIG. 2 is engaged with the central pinion gear 22, has been modified in FIG. 1 for explanation purposes only.

Figure 3:
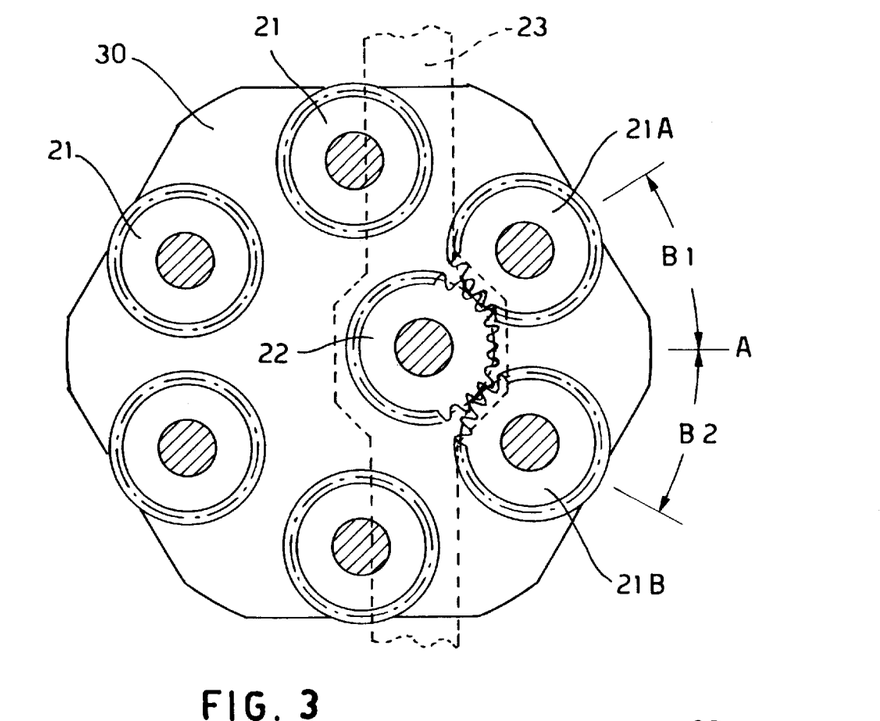
FIG. 3 is an enlarged detail of FIG. 2 illustrating engaging and the disengaging steps of a peripheral gear with respect to the central pinion gear.

With reference now to FIG. 3 and to the previous figures, we will better describe the characteristics and the working mode of the device 17 for selectively driving the pusher members 12 of the feeder.

FIG. 2 indicates the positions of each cylindrical gear 21 when the drum is at a standstill condition in which a bar to be worked is to be fed forward for a predetermined length through a corresponding spindle of the machine tool. Under this condition, the crown gear 21A is completely engaged with the pinion gear 22, thus maintaining a tangential arrangement of the respective "pitch line". Therefore, the drive motor 29, by the chain 27, the pinion gear 22, the gear set 21, 20, 19 and the endless chain 18A, drives the bar pushing member 12 to move the bar into the respective bar guide 11 for a predetermined distance.

However, as initially stated, the engagement of each cylindrical gear 21 with the central pinion gear 22 may occur with a certain advance because of the rotation of the drum 10. This engagement is maintained for a predetermined rotational angle, bridging the stop position A of the drum where each bar guide 11 of the feeder and the respective spindle of the machine tool are positioned in correspondence with a loading and forward feeding station for the bars.

More precisely, as shown in the scheme of FIG. 3, the engagement of each cylindrical gear 21 with the central pinion gear 22 occurs along an arched path having a predetermined length, comprising an inlet section B1 along which the gear 21A which is approaching to position A is engaging pinion 22, and an outlet section B2 along which the gear 21B, moving away from position A, disengages from pinion gear 22.

The beginning of the engagement phase of the gear 21A and the end of the disengagement phase of the gear 21B may coincide or may occur at different times taking advantage of the rotational movement of the drum 10 and the particular eccentric position of the pinion gear 22 with respect to the drum 10 and the set of cylindrical gears 21 the axes of which are arranged along a circumference concentric with the axis of the drum.

The advanced engagement of the crown gear 21A with the gear 22 at the inlet side B1, is allowed because the opening of the spindle collets of a machine tool occurs with a certain advance with respect to the working position where the bar is usually moved forward in the machine tool, and because the gear 21A, owing to the rotation of the drum 10, gradually approaches the pinion gear 22 which may freely rotate by keeping the drive motor 29 in idle condition while the gear 21B is disengaged. By suitably positioning the pinion gear 22 with an appropriate eccentricity both in vertical and horizontal directions with respect to the rotational axis of the drum 10, such as in an advanced angular position with respect to position A, it is possible to change the angular ratio between the inlet section B1 and the outlet section B2, typically with section B1 being equal to or larger than section B2.

In the event section B1 is larger than section B2 the disengagement of the gear 21B occurs before the engagement phase of the next cylindrical gear 21 entering section B1 is completed. The difference between the two angles B1 and B2 defines the angular advance of the gear 22 that permits operation of each crown gear 21 and therefore moves each bar pushing member 12 with a certain advance while the drum 10 of the feeder is still rotating. In this way making the invention bar feeding is particularly suitable for the feeder with machine tools of the fast type.

For explanatory purposes, consider that the six-spindle machine tools a rotation of about 40° is devised for the control cam driving all machine movements, including opening of a spindle collet which is approaching the position in which the forward movement of bars to be worked occurs, it is possible to provide an angular inlet section B1 of about 20° and an outlet section B2 having an equal wideness or less, for example of 15° in such a way that in the remaining 5° of drum rotation, the bar can be moved rapidly and before the drum has stopped rotating. Movement of the bar can continue for a period of time depending on the drive cam of the machine tool, with the drum at a standstill after the gear 21A has reached the position A shown in FIG. 2.

The advanced engagement of the inlet gear 21A with respect to the theoretic position A represented in FIG. 2 is advantageous because when starting the drive motor 29, the toothing of the gear 21 is already meshed with the toothing of gear 22, thus avoiding crashes or dangerous strikes of the gear teeth. Advantageously the gears may be constituted of a suitable plastic material, for example of polyurethane elastomeric material having a hardness equal to or higher than 80 Shores in order to take advantage from the same elasticity of the teeth to compensate for possible interference in case the gear teeth are slightly elongated and ended with a rounded tip in order to avoid direct contact among the tips of the same gears 21 and 22 while they are engaging at the beginning of the inlet section B1.

The use of plastic material for gears 21 and 22 as well as for rotating disk 13 and hub 14 is advantageous in that it substantially reduces the weight and rotational inertia of the drum during revolution, and avoiding kick back on the machine tool at each starting or stopping of the rotor. Therefore, fast rotating feeders may be provided according to the invention.

It is also important that the position of the central gear 22 could be changed or suitably adjusted with respect to the position of the crown gear 21A. In this connection, as already said with reference to FIG. 2, the central pinion gear 22 is positioned on a rod 23 pivoted to its upper end 24. At the opposite end of the rod 23 two adjustable stops 25 are provided on both sides, which comprise for example a bolt screwing into a corresponding support member fastened to the frame 16. By acting on the bolt it is possible to make the rod 23 slightly rotate around its pivot point 24, thereby adjusting the distance between the gear 22 and the gear 21 in the position A, with respect to a calculated theoretical position. In this case the rod 23 and the gear 22 are prevented from rocking by two side stops 25.

Figure 4:
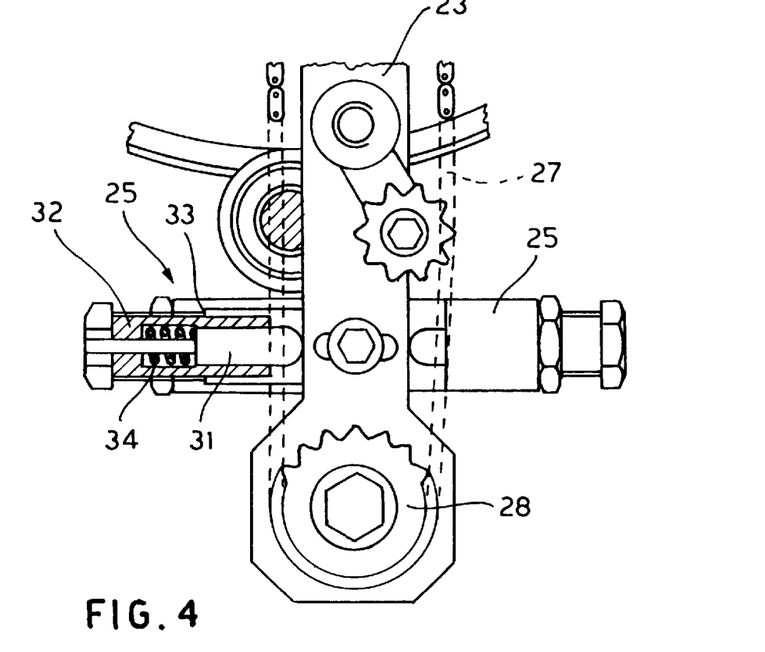
FIG. 4 is an enlarged detail of FIG. 2 illustrating a possible variation of the means for adjusting the position of the central pinion gear with respect to the crown gears driving the bar pushing members.

In some cases it would be more advantageous to allow the gear 22 to move a small distance away from the gear 21A in order to reduce possible stresses and wear caused by the initial mesh. In this connection, as shown in the detail of FIG. 4, the stop device 25 on the side of the rod 23 which is opposite with respect to the engagement side between gears 21 and 22, may be subjected to an elastically yieldable spring means which tends to push and makes the rod 23 rotate the gear 22 in the engagement direction with the gears 21. In particular, as shown in FIG. 4, the stop device 25 comprises a pin member 31 sliding a hollow screw 32 which may be screwed and blocked in an adjusted position into a support bush 33 by means of a suitable locking nut, as shown.

A spring 34 is housed in the hollow screw 32, to thrust the pin member 31 towards the bar 23 supporting the central pinion gear 22.

Figure 5:
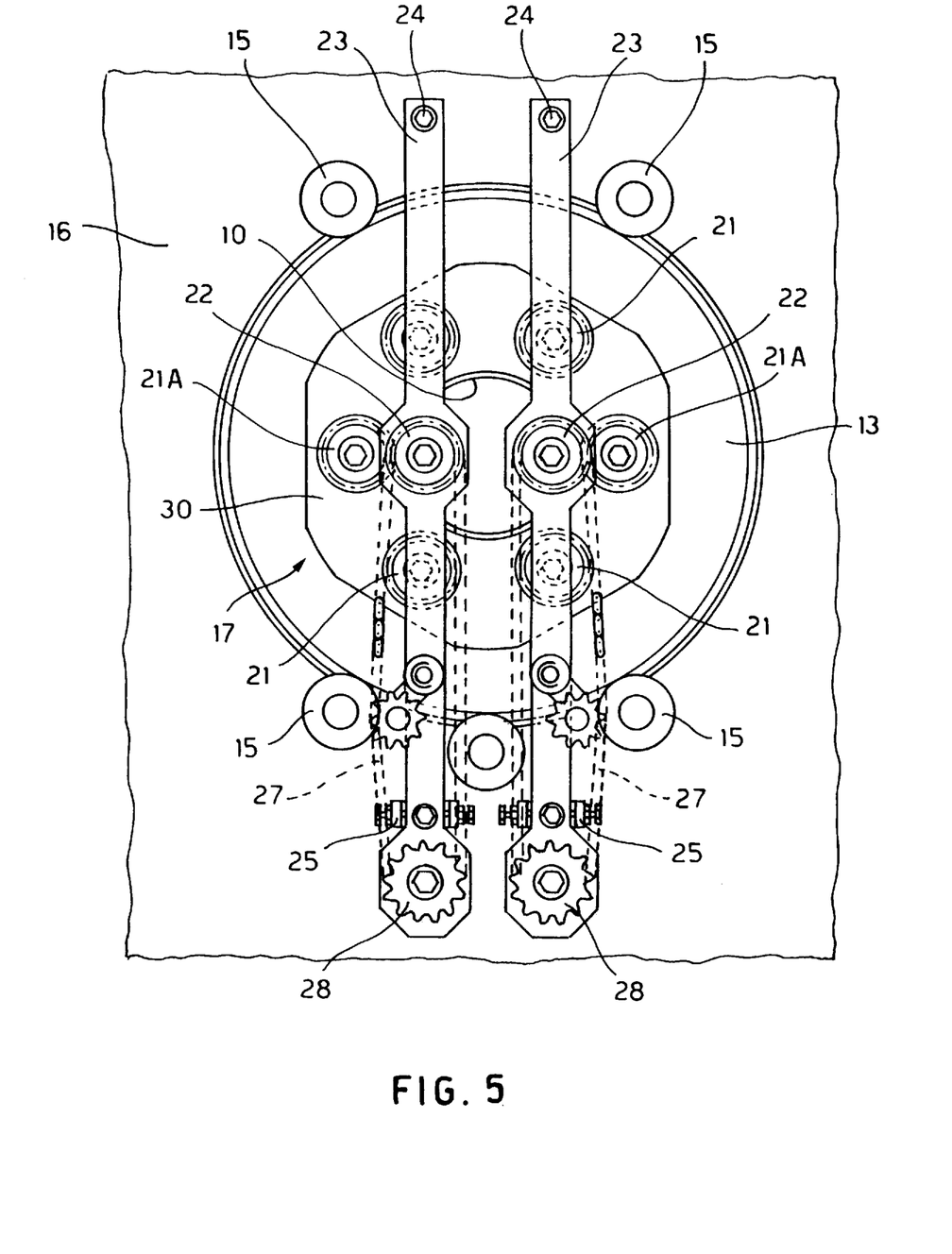
FIG. 5 shows a view similar to that of FIG. 2 for a further variation providing for the use of two independent drive pinion gears.

FIG. 5 of the attached drawings shown a further embodiment particularly suitable to be used with machine tools having two positions for loading and moving forwards the bars, which in the example of FIG. 5 are shown in diametrically opposite positions.

In the case of FIG. 5, two independent central pinion gears 22 are provided, each supported with its own drive motor by a rod 23, in a way similar to the one previously described when making reference to FIG. 2. In FIG. 5 the same reference numbers have been used to indicate similar or the same parts. Also the operating mode of the drive device of FIG. 5 substantially does not vary with respect to the one of FIG. 2 with the only difference that in this case there is the contemporaneous engagement of two crown gears with the respective central pinion gears and consequently the contemporaneous operation of the two bar pushing members which are arranged in opposite angular positions of the drum.

Figure 6:
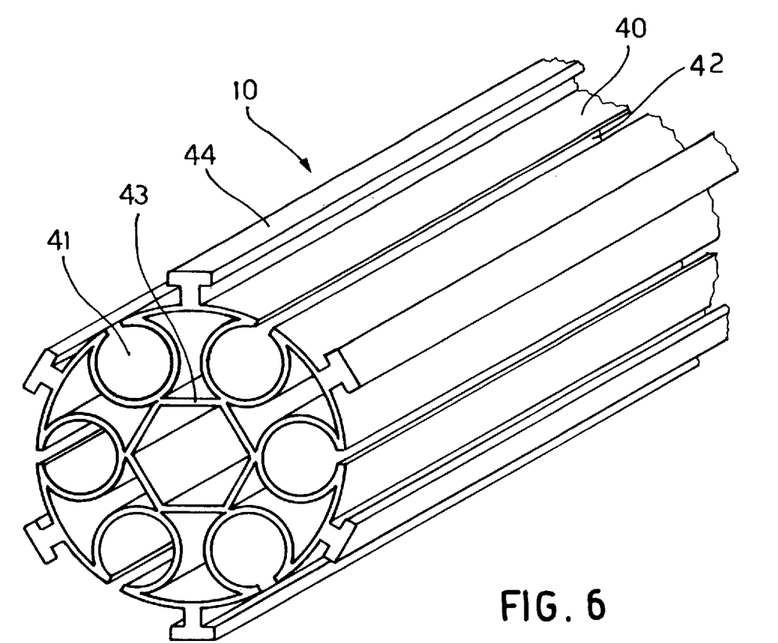
FIG. 6 is a perspective view of the drum.

With reference to FIGS. 6 and 7, we will now describe the general features of the bar feeder according to the invention.

As previously stated, the bar feeder substantially comprises a hollow tubular drum 10, better shown in the detail of FIG. 2.

The drum 10 of the feeder is moreover provided, in predetermined angular positions, with a plurality of bar guides 11, in which each bar guide 11 comprises two sets of opposed jaws, wherein a first set of jaws 35 is suitably fixed to the drum 10 by square rods 36 while the other set of jaws 37 is supported by rods 38 to rotate between open and closed conditions thus allowing the loading of a new bar in a predetermined angular position during the working cycle of the machine tool.

The bar guides 11 are supported in axially spaced apart positions of the drum 10, by means of a plurality of circular sectors 39 peripherally arranged around the tubular body of the drum 10, as shown in FIG. 2.

More precisely, according to a further feature of the invention, the drum 10 is in the form of a double wall cylindrical hollow body, for example extruded aluminium, comprising an external peripheral wall 40 and a plurality of reinforcement internal elements such as tubular elements 41 having the double function of reinforcing the drum 10 and housing both the chains 18A and connection members 18B which drive the bar pushing members 12. As clearly shown in FIG. 6, each tubular element 41 inside the drum 10, opens on the peripheral surface 40 by a longitudinal slit 42 which allows the protrusion of the plate 18 to which the corresponding pushing member 12 is fixed. To increase the resistance to bending and the twist stiffening of the drum, the same drum is provided with an inner wall 43 integral with the tubular elements 41 inside the drum.

The drum 10 is moreover provided with anchoring means for the circular sectors 39 supporting the bar guides which are longitudinally extending on the outer wall 40 of the drum. In the shown case, the anchoring means comprises T-shaped ribs 44 radially extending from the peripheral surface 40 in an intermediate position between the slits 42 of two adjacent tubular elements 41.

However, it is evident that for replacing the T-shaped ribs, any kind of suitably shaped ribs could be used, or alternatively the longitudinal anchoring means could be in turn constituted by a set of internal and/or external channel members, between the tubular elements 25.

The use of a hollow cylindrical body for the drum 10 provided with internal and/or external reinforcement means, allows for numerous and certain advantages, among them an increased ability of the drum to resist to bending and torsion during rotation, thus allowing perfect linearity of the guides and perfect alignment of the bars to the spindles of the machine tool. The possibility of obtaining the cylindrical body 10 from extruded aluminium remarkably reduces the weight of the drum and inertia problems when the bar feeder is connected to fast-operated machine tools. It is clear from FIG. 2 that the internal tubular elements 41 and the T-shaped ribs 44 co-operate to increase the resistance to the bending stress, consequently increasing the twisting torque. Moreover, the internal tubular elements 41 and the external ribs 44 are advantageously used for additional functions greatly simplifying the structure of the whole rotating drum.

As initially said, each bar guide 11 is constituted by a set of fixed jaws 35 and by a set of turntable jaws 37 connected to rods 36 and 38 supported by as plurality of shaped plates 39 circumferentially arranged on the outer wall of the drum 10.

More precisely, as shown in FIG. 7, in correspondence to each support point of the bar guides 11, a set of the circular sectors 39 is provided, the number of each being equal to the number of the bar guides 11, circumferentially arranged around the cylindrical body 10 of the drum. Each circular sector 39 is in the form of a section of a circle corresponding to the cylindrical outer surface of the drum 10. Each circular sector 39 and the drum 10 are moreover provided with connecting means comprising a T-shaped slot 45 at the inside edge of circular sector 39, which slidingly fits on a corresponding T-shaped rib 44 of the drum 10. In this way the circular sectors 39 for the bar guides 11 may be easily assembled and positioned in a perfectly aligned way, by simply sliding each rib 44 to the predetermined position of guide support.

Each circular plate 39, in turn, is provided at one end with a square hole 46 for a square rod 36 for the fixed jaws 35 and, at the other end, a circular hole 47 is provided for the rotation of the square rod 48 to which the mobile jaws 37 are fixed.

From FIG. 7 of the attached drawings, it can also be seen that each circular sector 39 at each end is delimited by a flat surface which, together with the opposite flat surface of an adjacent plate, defines a radial slit 49 axially aligned with a longitudinal slit 42 on the peripheral surface of the drum 10, to allow the passage of the plate 18.

From the above, it is evident that according to a particular embodiment of the invention, a bar feeder for multi-spindle machine tools has been provided comprising a rotating drum having a particular structural shape, which at the same time is extremely stiff and light as it can be extruded in the form of an aluminium section with all involved functional advantages. Moreover, the use of arch shaped plates for supporting the guides for the bars in combination with connecting means allowing sliding the support plates during assembly on the cylindrical drum, greatly simplify the structure of the feeder with the subsequent constructive and maintenance advantages.

From what is said and shown in the attached drawings it is evident that a bar feeder has been provided comprising a gearing device of new design for driving the single pushing members to advance the bars along the guides on a rotating drum, and towards the respective spindles of a machine tool, in which a quite simple and advantageous use is made of the rotational movement of the drum, to selectively engage a set of crown gears connected to the bar-pushing members, peripherally arranged around the rotational axis of the drum, with a central pinion gear in an eccentric and misaligned position, in such a way that the engagement of each crown gear is kept over a predetermined arched path, thus eliminating the use of mechanical couplings and of the cam system employed in the bar feeder previously known. It is thus obtained a feeder structure extremely simple, lightened and particularly suitable for application on machine tools of the fast type. Practically, it has been found that the present invention causes a reduction of substantially ⅓ of the weight of the drive members which are to be necessarily supported by the drum. Moreover, by suitably choosing the diameters and the positions of the various crown gears as well as the eccentricity of the central pinion gear, it is possible to obtain an advanced drive of each bar-pushing member or to vary the same advance when the drum is still rotating. The use of suitable materials and design for the rotating drum, the guides for the bars, the gears and for the several components of the entire device, allow for a further reduction in the weight of the rotating masses.

I claim:

1. A bar feeder for a multi-spindle machine tool, comprising:

plural bar pushing members arrayed about a central axis;

plural peripheral gears rotatable about the central axis with said plural bar pushing members, each of said peripheral gears for operating a respective one of said bar pushing members;

at least one pinion gear carried tangentially inside said plural peripheral gears for selectively engaging and driving each of said peripheral gears over an arched path about the central axis defined by rotation of said plural peripheral gears about the central axis; and means for adjusting a distance between said pinion gear and said peripheral gears.

2. The bar feeder of claim 1, wherein said means for adjusting comprises a rod traversing said plural peripheral gears and carrying said pinion gear, said rod pivoting at one end thereof for pivotally adjusting a distance between said pinion gear and said peripheral gears.

3. The bar feeder of claim 2, further comprising an adjustable stop member at another end of said rod for setting the distance between said pinion gear and said peripheral gears.

4. The bar feeder of claim 3, wherein said adjustable stop comprises a spring to urge said pinion gear into engagement with said peripheral gears over said arched path.

5. The bar feeder of claim 1, wherein the arched path includes a first portion before a one of said peripheral gears engaging said pinion gears reaches a completely engaged position and a second portion after the completely engaged position, wherein said first portion is larger than said second portion.

6. The bar feeder of claim 1, wherein each of said peripheral gears partially engages said pinion gear before reaching a completely engaged position so that said bar pushing member is operated prior to the completely engaged position.

7. The bar feeder of claim 6, further comprising means for idling said pinion gear before said pinion gear is fully engaged with one of said peripheral gears.

8. A bar feeder for a multi-spindle machine tool, comprising:

plural bar pushing members arrayed about a central axis;

plural peripheral gears rotatable about the central axis with said plural bar pushing members, each of said peripheral gears for operating a respective one of said bar pushing members;

at least one pinion gear carried tangentially inside said plural peripheral gears for selectively engaging and driving each of said peripheral gears over an arched path about the central axis defined by rotation of said plural peripheral gears about the central axis; and a rotatable drum carrying said bar pushing members, wherein said drum comprises a tubular outer shell with slits therein and a tubular hollow inner shell defining an annular chamber therebetween, said inner and outer shells being coaxial with the central axis, and plural tubular members within said annular chamber with axes parallel to the central axis, each said tubular member having a slit therein that corresponds to one of said slits in said outer shell for defining a range of movement of one of said bar pushing members.

9. The bar feeder of claim 8, further comprising bar guide members carried on said outer shell by plural shaped plates removably affixed to said outer shell, said shaped plates being angularly spaced from one another by spaces that correspond to said slits.

10. The bar feeder of claim 9, wherein said plural shaped plates are arcuate and are circumferentially arranged on said outer shell.

11. The bar feeder of claim 8, wherein said plural shaped plates each comprises a T-shaped slot, and said outer shell comprises corresponding T-shaped ribs for removably affixing said plates to said outer shell.

12. A bar feeder for a multi-spindle machine tool, comprising:

plural bar pushing members arrayed about a central axis;

plural peripheral gears rotatable about the central axis with said plural bar pushing members, each of said peripheral gears for operating a respective one of said bar pushing members;

a pinion gear carried tangentially inside said plural peripheral gears for selectively engaging each of said peripheral gears over an arched path about the central axis defined by rotation of said plural peripheral gears about the central axis; wherein the arched path includes a first portion before a one of said peripheral gears engaging said pinion gear reaches a completely engaged position and a second portion after the completely engaged position, said first portion being larger than said second portion.

13. The bar feeder of claim 12, further comprising means for adjusting a distance between said pinion gear and said peripheral gears.

14. The bar feeder of claim 12, further comprising a rod traversing said plural peripheral gears and carrying said pinion gear, said rod for adjusting a distance between said pinion gear and said peripheral gears.

15. A drive device for a bar feeder for a multi-spindle machine tool, the device comprising:

plural peripheral gears for operating respective bar pushing members of the bar feeder;

a pinion gear for selectively driving each of said peripheral gears; and a rod extended chord-wise across said plural peripheral gears, said rod being pivoted at one end and carrying said pinion gear tangentially inside said plural peripheral gears into engagement with one of said peripheral gears.

16. The drive device of claim 15, wherein said rod carries a drive motor for driving said pinion gear at another end thereof.

17. The drive device of claim 15, wherein said plural peripheral gears are rotatable about a central axis, and wherein said pinion gear engages said one peripheral gear over an arched path about the central axis.

18. A drive device for a bar feeder for a multi-spindle machine tool, the device comprising:

plural peripheral gears for operating respective bar pushing members of the bar feeder;

a pinion gear for selectively driving each of said peripheral gears;

a rod extended chord-wise across said plural peripheral gears, said rod carrying said pinion gear tangentially inside said plural peripheral gears into engagement with one of said peripheral gears; and a second said rod extended chord-wise across said plural peripheral gears, and a second said pinion gear carried by said second rod for driving another one of said plural peripheral gears.

19. A bar feeder for a multi-spindle machine tool, comprising:

plural bar pushing members arrayed about a central axis;

plural peripheral gears rotatable about the central axis with said plural bar pushing members, each of said peripheral gears for operating a respective one of said bar pushing members when rotated to a first position;

a pinion gear for selectively engaging each of said peripheral gears in advance of said first position so that each of said bar pushing members is preliminarily operated prior to said first position; and a rod traversing said plural peripheral gears and carrying said pinion gear, said rod for adjusting a distance between said pinion gear and said peripheral gears.

20. The bar feeder of claim 19, wherein said pinion gear is carried tangentially inside said plural peripheral gears for selectively engaging each of said peripheral gears over an arched path about the central axis.

21. A bar feeder for a multi-spindle machine tool, comprising:

plural bar pushing members arrayed about a central axis;

plural peripheral gears rotatable about the central axis with said plural bar pushing members, each of said peripheral gears for operating a respective one of said bar pushing members; and at least one pinion gear carried tangentially inside said plural peripheral gears for selectively engaging and driving each of said peripheral gears over an arched path about the central axis defined by rotation of said plural peripheral gears about the central axis, each of said peripheral gears partially engaging said pinion gear before reaching a completely engaged position so that said bar pushing member is operated prior to the completely engaged position.

22. The bar feeder of claim 21, further comprising a movable support member for carrying said pinion gear and elastic biasing means for resiliently urging said movable support member, thereby smoothing the meshing of said pinion gear with said peripheral gears.

23. The bar feeder of claim 22, wherein said movable support member comprises a rod pivoted at one end, and wherein said elastic biasing member comprises a spring at the other end of said rod.

24. A drive device for a bar feeder for a multi-spindle machine tool, the device comprising:

plural peripheral gears for operating respective bar pushing members of the bar feeder;

a pinion gear for selectively driving each of said peripheral gears;

a movable support member extended chord-wise across said plural peripheral gears, said movable support member carrying said pinion gear tangentially inside said plural peripheral gears into engagement with one of said peripheral gears; and means for resiliently urging said movable support member so that said pinion gear is resiliently urged into engagement with one of said peripheral gears.

* * * * *